US012625269B2

(12) United States Patent
Gunnam

(10) Patent No.: US 12,625,269 B2
(45) Date of Patent: *May 12, 2026

(54) MULTIPLE RESOLUTION, SIMULTANEOUS LOCALIZATION AND MAPPING BASED ON 3-D LIDAR MEASUREMENTS

(71) Applicant: Velodyne Lidar USA, Inc., San Jose, CA (US)

(72) Inventor: Kiran K. Gunnam, Milpitas, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 18/484,573

(22) Filed: Oct. 11, 2023

(65) Prior Publication Data

US 2024/0036207 A1      Feb. 1, 2024

Related U.S. Application Data

(63) Continuation of application No. 16/130,610, filed on Sep. 13, 2018, now Pat. No. 11,821,987.

(Continued)

(51) Int. Cl.
*G01S 17/89*      (2020.01)
*G01S 7/48*      (2006.01)
(Continued)

(52) U.S. Cl.
CPC ............ *G01S 17/89* (2013.01); *G01S 7/4808* (2013.01); *G01S 7/4817* (2013.01); *G01S 17/10* (2013.01); *G01S 17/34* (2020.01); *G01S 17/42* (2013.01)

(58) Field of Classification Search
CPC ........ G01S 17/89; G01S 17/42; G01S 17/931; G01S 17/894; G01S 17/88; G01S 17/00;
(Continued)

(56) References Cited

U.S. PATENT DOCUMENTS 7,969,558 B2      6/2011  Hall
8,675,181 B2      3/2014  Hall
(Continued)

FOREIGN PATENT DOCUMENTS

JP            2017116445  A      6/2017
WO      WO-2005086460  A1 *   9/2005    ........... H04L 69/329
(Continued)

OTHER PUBLICATIONS

KR10-2020-7010655, "Office Action", Apr. 18, 2024, 22 pages.
(Continued)

*Primary Examiner* — Brandon Z Willis

(74) *Attorney, Agent, or Firm* — Kilpatrick Townsend & Stockton LLP

(57)      ABSTRACT

Methods and systems for improved simultaneous localization and mapping based on 3-D LIDAR image data. In one aspect, LIDAR image frames are segmented and clustered before feature detection to improve computational efficiency while maintaining both mapping and localization accuracy. Segmentation involves removing redundant data before feature extraction. Clustering involves grouping pixels associated with similar objects together before feature extraction. In another aspect, features are extracted from LIDAR image frames based on a measured optical property associated with each measured point. The pools of feature points comprise a low resolution feature map associated with each image frame. Low resolution feature maps are aggregated over time to generate high resolution feature maps. In another aspect, the location of a LIDAR measurement system in a three dimensional environment is slowly updated based on the high resolution feature maps and quickly updated based on the low resolution feature maps.

20 Claims, 7 Drawing Sheets

Related U.S. Application Data

(60) Provisional application No. 62/558,256, filed on Sep. 13, 2017.

(51) Int. Cl.

| | |
|---|---|
| *G01S 7/481* | (2006.01) |
| *G01S 17/10* | (2020.01) |
| *G01S 17/34* | (2020.01) |
| *G01S 17/42* | (2006.01) |

(58) Field of Classification Search

CPC ........ G01S 17/34; G01S 17/10; G01S 7/4808; G01S 7/4865; G01S 7/521; G01S 7/55; G01S 7/4817; G01S 19/42; G06T 2207/10028; G06T 5/50; G06T 2200/04

See application file for complete search history.

(56) References Cited

U.S. PATENT DOCUMENTS

| | | | | |
|---|---|---|---|---|
| 8,767,190 | B2 | 7/2014 | Hall | |
| 9,286,538 | B1 * | 3/2016 | Chen ...................... | G06T 11/003 |
| 10,049,492 | B2 * | 8/2018 | Babahajiani .......... | G06T 15/506 |
| 2010/0020306 | A1 | 1/2010 | Hall | |
| 2010/0271615 | A1 * | 10/2010 | Sebastian ............... | G06V 40/20 356/28 |
| 2011/0147567 | A1 | 6/2011 | Grazioso et al. | |
| 2014/0350839 | A1 * | 11/2014 | Pack ................... | G05D 1/0231 901/1 |
| 2016/0009410 | A1 | 1/2016 | Derenick et al. | |
| 2016/0132056 | A1 | 5/2016 | Yoshino | |
| 2017/0219695 | A1 | 8/2017 | Hall et al. | |
| 2017/0248963 | A1 | 8/2017 | Levinson et al. | |
| 2017/0269215 | A1 * | 9/2017 | Hall ........................ | G01S 17/89 |
| 2018/0075643 | A1 * | 3/2018 | Sequeira ................. | G06T 7/579 |
| 2018/0136651 | A1 | 5/2018 | Levinson et al. | |

FOREIGN PATENT DOCUMENTS

| | | |
|---|---|---|
| WO | 2016162568 A1 | 10/2016 |
| WO | 2018127789 A1 | 7/2018 |

OTHER PUBLICATIONS

U.S. Appl. No. 16/130,610, "Corrected Notice of Allowability", Sep. 22, 2023, 2 pages.

U.S. Appl. No. 16/130,610, "Corrected Notice of Allowability", Sep. 5, 2023, 2 pages.

U.S. Appl. No. 16/130,610, Notice of Allowance, Mailed on Jul. 12, 2023, 5 pages.

Application No. CN201880073151.6, Office Action, Mailed on Feb. 10, 2023, 28 pages.

Application No. CN201880073151.6, Office Action, Mailed on Aug. 18, 2023, 8 pages.

Application No. EP18856955.2, Extended European Search Report, Mailed on Jul. 8, 2021, 13 pages.

Application No. EP18856955.2, Office Action, Mailed on Jul. 31, 2023, 6 pages.

Javanmardi et al., "Autonomous Vehicle Self-localization Based on Multilayer 2D Vector Map and Multi-channel LiDAR", Institute of Electrical and Electronics Engineers, Symposium on Intelligent Vehicle, Jun. 11, 2017, pp. 437-442.

JP2020515223, "Notice of Reason for Rejection", Mailed on May 16, 2023, 5 pages.

JP2020515223, "Notice of Reason for Rejection", Mailed on Mar. 8, 2022, 8 pages.

Application No. JP2020-515223 , Notice of Decision to Grant, Mailed on Sep. 5, 2023, 4 pages.

Application No. JP2020-515223 , Office Action, Mailed on May 16, 2023, 3 pages.

Kwon et al., "Building 3D Visual Maps of Interior Space With a New Hierarchical Sensor Fusion Architecture", Robotics and Autonomous Systems, vol. 61, No. 8, Aug. 2013, pp. 749-767.

Application No. PCT/US2018/050934 , International Search Report and Written Opinion, Mailed on Nov. 20, 2018, 8 pages.

* cited by examiner

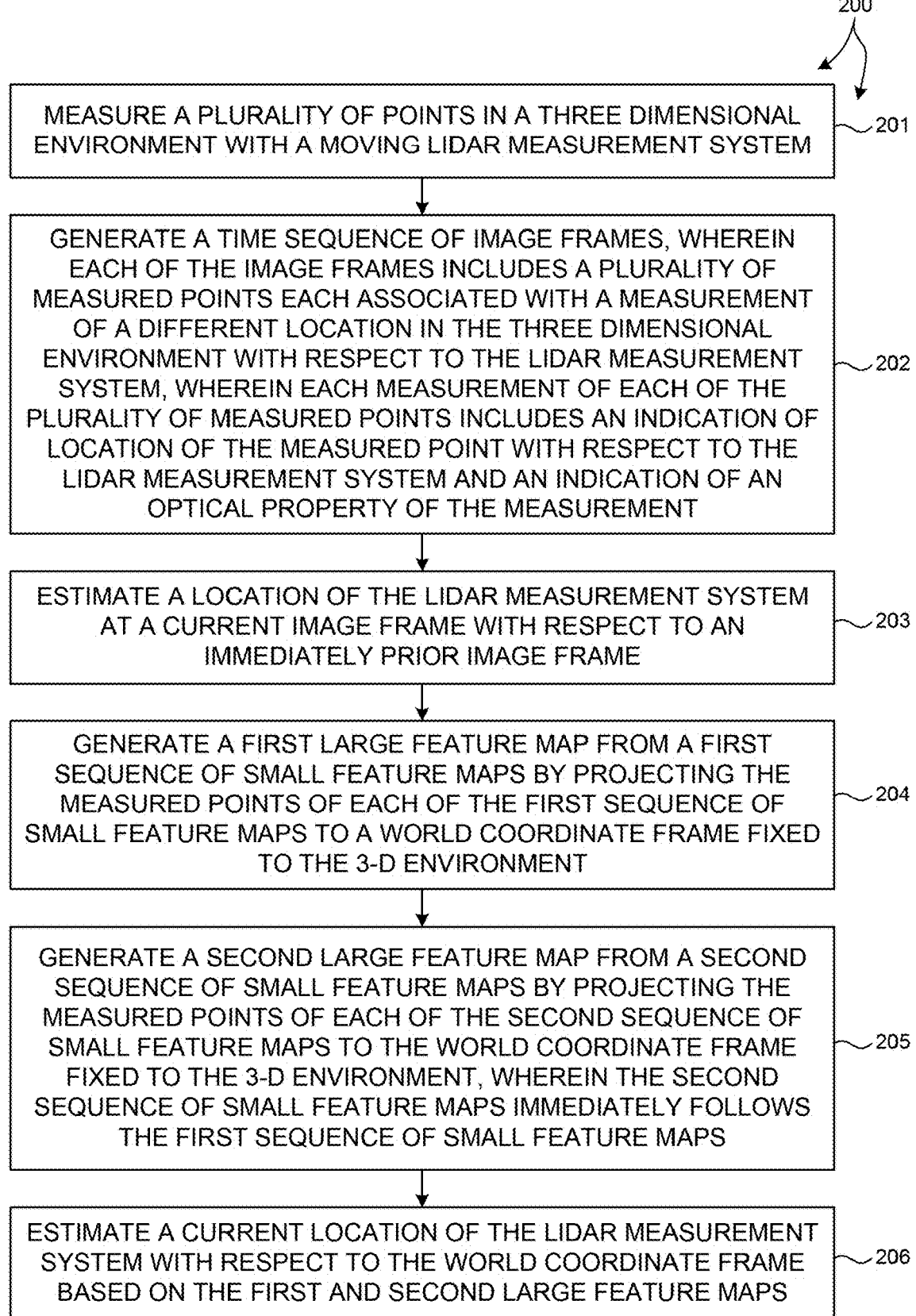

200

MEASURE A PLURALITY OF POINTS IN A THREE DIMENSIONAL ENVIRONMENT WITH A MOVING LIDAR MEASUREMENT SYSTEM — 201

GENERATE A TIME SEQUENCE OF IMAGE FRAMES, WHEREIN EACH OF THE IMAGE FRAMES INCLUDES A PLURALITY OF MEASURED POINTS EACH ASSOCIATED WITH A MEASUREMENT OF A DIFFERENT LOCATION IN THE THREE DIMENSIONAL ENVIRONMENT WITH RESPECT TO THE LIDAR MEASUREMENT SYSTEM, WHEREIN EACH MEASUREMENT OF EACH OF THE PLURALITY OF MEASURED POINTS INCLUDES AN INDICATION OF LOCATION OF THE MEASURED POINT WITH RESPECT TO THE LIDAR MEASUREMENT SYSTEM AND AN INDICATION OF AN OPTICAL PROPERTY OF THE MEASUREMENT — 202

ESTIMATE A LOCATION OF THE LIDAR MEASUREMENT SYSTEM AT A CURRENT IMAGE FRAME WITH RESPECT TO AN IMMEDIATELY PRIOR IMAGE FRAME — 203

GENERATE A FIRST LARGE FEATURE MAP FROM A FIRST SEQUENCE OF SMALL FEATURE MAPS BY PROJECTING THE MEASURED POINTS OF EACH OF THE FIRST SEQUENCE OF SMALL FEATURE MAPS TO A WORLD COORDINATE FRAME FIXED TO THE 3-D ENVIRONMENT — 204

GENERATE A SECOND LARGE FEATURE MAP FROM A SECOND SEQUENCE OF SMALL FEATURE MAPS BY PROJECTING THE MEASURED POINTS OF EACH OF THE SECOND SEQUENCE OF SMALL FEATURE MAPS TO THE WORLD COORDINATE FRAME FIXED TO THE 3-D ENVIRONMENT, WHEREIN THE SECOND SEQUENCE OF SMALL FEATURE MAPS IMMEDIATELY FOLLOWS THE FIRST SEQUENCE OF SMALL FEATURE MAPS — 205

ESTIMATE A CURRENT LOCATION OF THE LIDAR MEASUREMENT SYSTEM WITH RESPECT TO THE WORLD COORDINATE FRAME BASED ON THE FIRST AND SECOND LARGE FEATURE MAPS — 206

FIG. 8

MULTIPLE RESOLUTION, SIMULTANEOUS LOCALIZATION AND MAPPING BASED ON 3-D LIDAR MEASUREMENTS

CROSS-REFERENCES TO RELATED APPLICATIONS

The present application is a continuation of U.S. application Ser. No. 16/130,610, now U.S. Pat. No. 11,821,987, entitled "Multiple Resolution, Simultaneous Localization And Mapping Based On 3-D LIDAR Measurements", filed Sep. 13, 2018, and claims priority to U.S. Provisional patent application Ser. No. 62/558,256 entitled "Multiple Resolution, Simultaneous Localization And Mapping Based On 3-D LIDAR Measurements," filed Sep. 13, 2017, the subject matter of each which are incorporated herein by reference in their entirety.

TECHNICAL FIELD

The described embodiments relate to LIDAR based 3-D point cloud measuring systems, and more specifically, efficient mapping of the measured environment and localization of the LIDAR measurement system.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e. single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In many applications it is necessary to see over a broad field of view. For example, in an autonomous vehicle application, the vertical field of view should extend down as close as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles),In some examples, viewing software is employed to render the resulting point clouds as images that appear three dimensional to a user. Different schemes can be used to depict the distance measurements as 3-D images that appear as if they were captured by a live action camera.

In an autonomous vehicle application, it is desirable to construct a three dimensional geometrical map of the surrounding environment and locate the LIDAR measurement system within the environment. In many existing examples, the three dimensional map is constructed first and then the LIDAR measurement system is located within the mapped environment. However, this approach is often limited to well controlled, indoor environments or slow moving operational scenarios which are not consistent with actual driving conditions.

Improvements in real-time mapping and localization of LIDAR measurement systems are desired. In particular, simultaneous localization and mapping compatible with highly dynamic urban, sub-urban, and highway environments is desired.

BRIEF SUMMARY OF THE INVENTION

Methods and systems for improved simultaneous localization and mapping based on 3-D LIDAR image data are presented herein.

In one aspect, LIDAR image frames are segmented and clustered before feature detection. The detected features are employed to perform SLAM analysis. Performing segmentation and clustering before feature detection improves computational efficiency while maintaining both mapping and localization accuracy for an autonomous vehicle application.

Segmentation involves removing redundant data before feature extraction. In this manner, each image frame includes high resolution data only in the region of interest (ROI) and lower resolution in regions that are sufficiently well described with fewer pixels, or none at all. In one example, segmentation involves eliminating redundant points associated with the ground plane. By reducing the number of pixels in each image frame, the amount of data associated with each image frame is reduced.

In one embodiment, redundant pixels are identified based on elevation.

In some embodiments, a three dimensional image frame is subdivided into a 3D grid map. The cells of the 3D grid map are projected along the vertical direction (e.g., perpendicular to the ground plane) to generate a 2D grid map.

In one example, the elevation of each measured point is compared to the vehicle height to determine whether the measured point is redundant.

In another example, the elevation of each measured point is compared to a predetermined threshold value to determine whether the measured point is redundant.

In another example, the number of measured points in each cell of the 2D projection of the 3D grid map is employed to determine whether measured points in the cell are redundant.

In another example, an average value of an optical property associated with each measured point within a cell is determined. For example, the optical property may be the measured intensity, reflectivity, reliability, or some combination thereof. The difference between the measured optical property associated with an individual measured point and the average value is employed to determine if the measured point is redundant.

In another example, a difference between the maximum and minimum elevations of all measured points in a cell is employed to determine whether the measured points in the cell are redundant.

In another example, an average value of the elevation associated with the measured points in a cell and the average elevation value associated with measured points in each neighboring cell are determined. If the difference between the average elevation associated with any of the neighboring cells and the cell in question exceeds a predetermined threshold value, the measured points associated with the cell are determined to be not redundant.

In another aspect, groups of pixels associated with similar objects are clustered to reduce the computational complexity of subsequent feature detection operations. In this manner, feature detection is performed on pixel data associated with one object, rather than many objects.

In another aspect, features are extracted from LIDAR image frames based on the measured optical property associated with each measured point (e.g., intensity, reflectivity, reliability, or a combination thereof).

In one embodiment, features are quickly detected from LIDAR image frames based on values of the reflectivity gradient. The reflectivity gradient is a bounded integer and these values can be sorted efficiently.

In another embodiment, features are quickly detected from LIDAR image frames based on values of an overall contrast value involving any number of optical properties.

Pixels are sorted into different bins according to their gradient values. The bins are sorted into different pools (i.e., different feature sets) based on their gradient values. The different pools of features are associated with different objects, e.g., ground, walls, trees, etc. In this manner, structured output (i.e., feature sets) is generated that identifies different physical objects in the surrounding environment. The pools of feature points comprise a small feature map (SFM) associated with each image frame.

In another aspect, an estimation of the location of a LIDAR measurement system is quickly determined based on low resolution feature maps refreshed at a high repetition rate, while the estimation of location is accurately updated based on higher resolution feature maps refreshed at a lower repetition rate.

In a further aspect, global map of the three dimensional environment is periodically and consistently updated based on higher resolution feature maps and the estimated of location of the LIDAR measurement system.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

BRIEF DESCRIPTION OF THE DRAWINGS

FIG. 8 depicts a flowchart illustrative of a method 200 of performing a LIDAR measurement by an integrated LIDAR measurement device in at least one novel aspect.

DETAILED DESCRIPTION OF THE INVENTION

Reference will now be made in detail to background examples and some embodiments of the invention, examples of which are illustrated in the accompanying drawings.

Methods and systems for improved simultaneous localization and mapping based on 3-D LIDAR image data are presented herein.

Simultaneous localization and mapping (SLAM) involves building a consistent three dimensional geometric map of the environment traversed by a LIDAR measurement system while estimating the position of the LIDAR measurement system within the environment in six degrees of freedom (e.g., x, y, z, Rx, Ry, Rz) in real time. SLAM analysis is performed based on the point cloud distance measurement data generated by a LIDAR measurement system.

Figure 1:
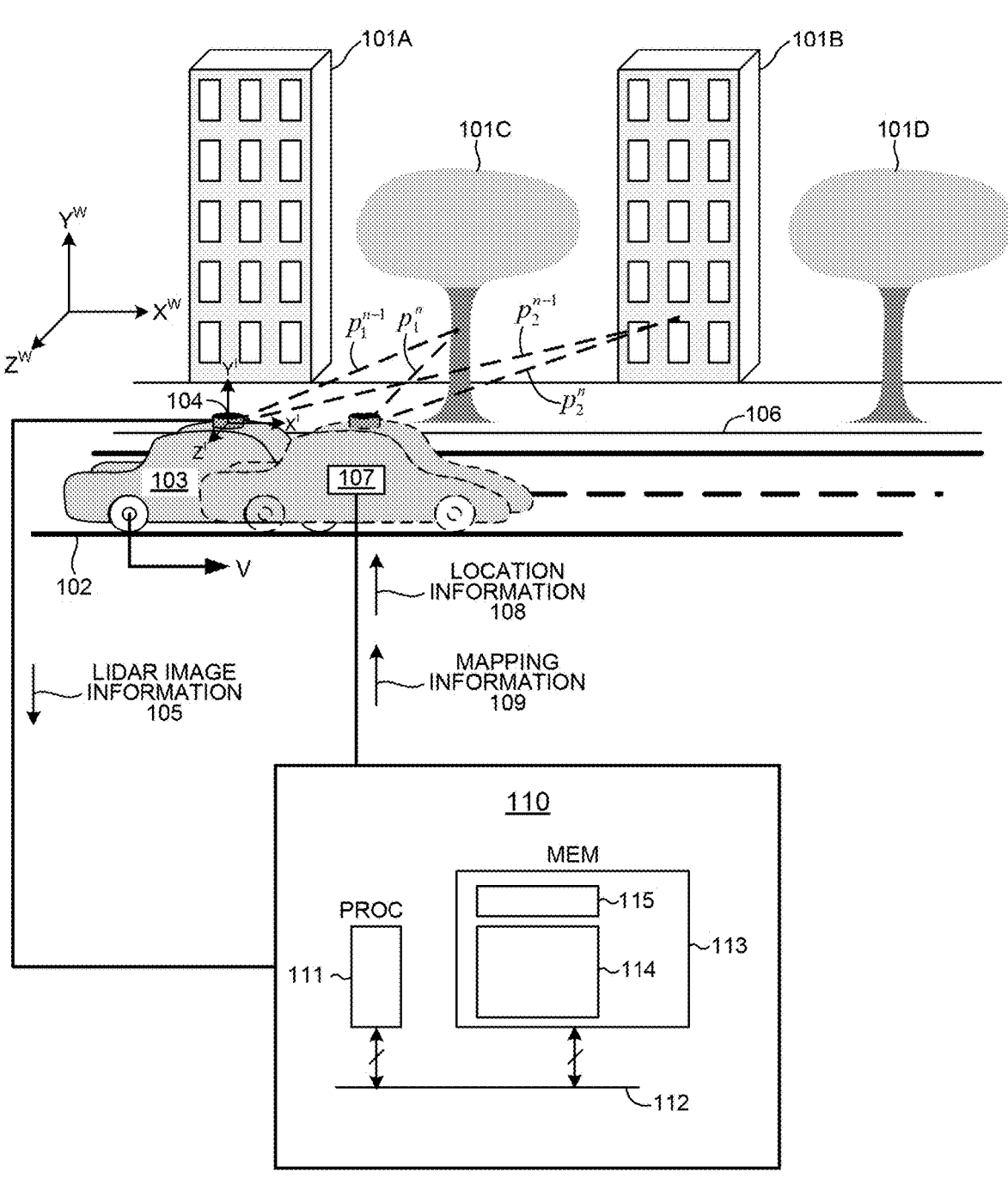
FIG. 1 is a diagram illustrative of an operational scenario including a LIDAR based, three dimensional imaging system 104 and a computing system 110 configured to simultaneously map the surrounding environment and locate the LIDAR measurement system 104 within the environment in real time.

FIG. 1 depicts an operational scenario including a LIDAR based, three dimensional imaging system 104 and a computing system 110 configured to simultaneously map the surrounding environment and locate the LIDAR measurement system 104 within the environment in real time. In the embodiment depicted in FIG. 1, a vehicle 103 drives along a roadway 102 at a velocity, V. The surrounding environment includes various objects including buildings 101A and 101B, trees 101C and 101D, the surface of roadway 102, curb 106, etc. The surrounding environment includes static objects that do not move with respect to a world coordinate frame, e.g., world coordinate frame (Xw,Yw,zw) depicted in FIG. 1. LIDAR measurement system 104 is attached to vehicle 103 and acquires three dimensional point cloud data associated with images of the surrounding environment. Instantaneous coordinate frame (X1,Y 1,Z 1) is attached to LIDAR measurement system 104. LIDAR measurement system 104 generates point cloud data measured with reference to the instantaneous coordinate frame. In other words, the distance measurements performed by LIDAR system 104 are measured with respect to the LIDAR measurement system 104, itself. The instantaneous coordinate frame moves with vehicle 103. Hence, the location of the instantaneous coordinate frame with respect to the world coordinate frame changes with the location of vehicle 103, and each image frame generated from a set of point cloud data is associated with a different location of the instantaneous coordinate frame within the world coordinate frame.

In the depicted embodiment, LIDAR image information 105 is communicated from LIDAR measurement system 104 to one or more computing systems 110 for further analysis. LIDAR image information 105 includes point cloud data associated with each set of point cloud data including position information (e.g., theta, phi, distance) and optical information (e.g., reflectivity, intensity, reliability, or some combination thereof). In one embodiment, multiple resolution SLAM is employed to build a consistent three dimensional map 109 of the environment and estimate the location 108 of the LIDAR measurement system 104 with respect to the world coordinate frame based on the point cloud distance measurement data 105 generated by LIDAR measurement system 104. The resulting mapping information 109 and location information 108 are communicated to vehicle control system 107. Vehicle control system 107 controls various aspects of vehicle 103 (e.g., vehicle speed, steering angle, braking force, indicator lights, etc.) based on the updated location information 108 and mapping information 109.

In one aspect, LIDAR image frames are segmented and clustered before feature detection and the detected features are employed to perform SLAM analysis as described herein. Typically, feature detection and SLAM analysis is performed directly on measured point cloud data. However, this approach is computationally expensive and time consuming. The inventors have discovered that by performing segmentation and clustering before feature detection and SLAM, computational efficiency can be dramatically improved while maintaining both mapping and localization accuracy for an autonomous vehicle application.

To reduce the amount of data subject to SLAM analysis, LIDAR image frames are segmented to identify and remove redundant data points or data points that are not relevant to an autonomous vehicle application. In addition, the image data is clustered to group image data points associated with similar objects. After this data reduction, feature detection is employed to identify specific objects, e.g., ground, walls, trees, etc. In some examples, a 40x reduction in data points is achieved by performing segmentation and clustering before feature detection as described herein. After feature detection, SLAM analysis is performed on a very limited set of data associated with relevant objects.

Figure 2:
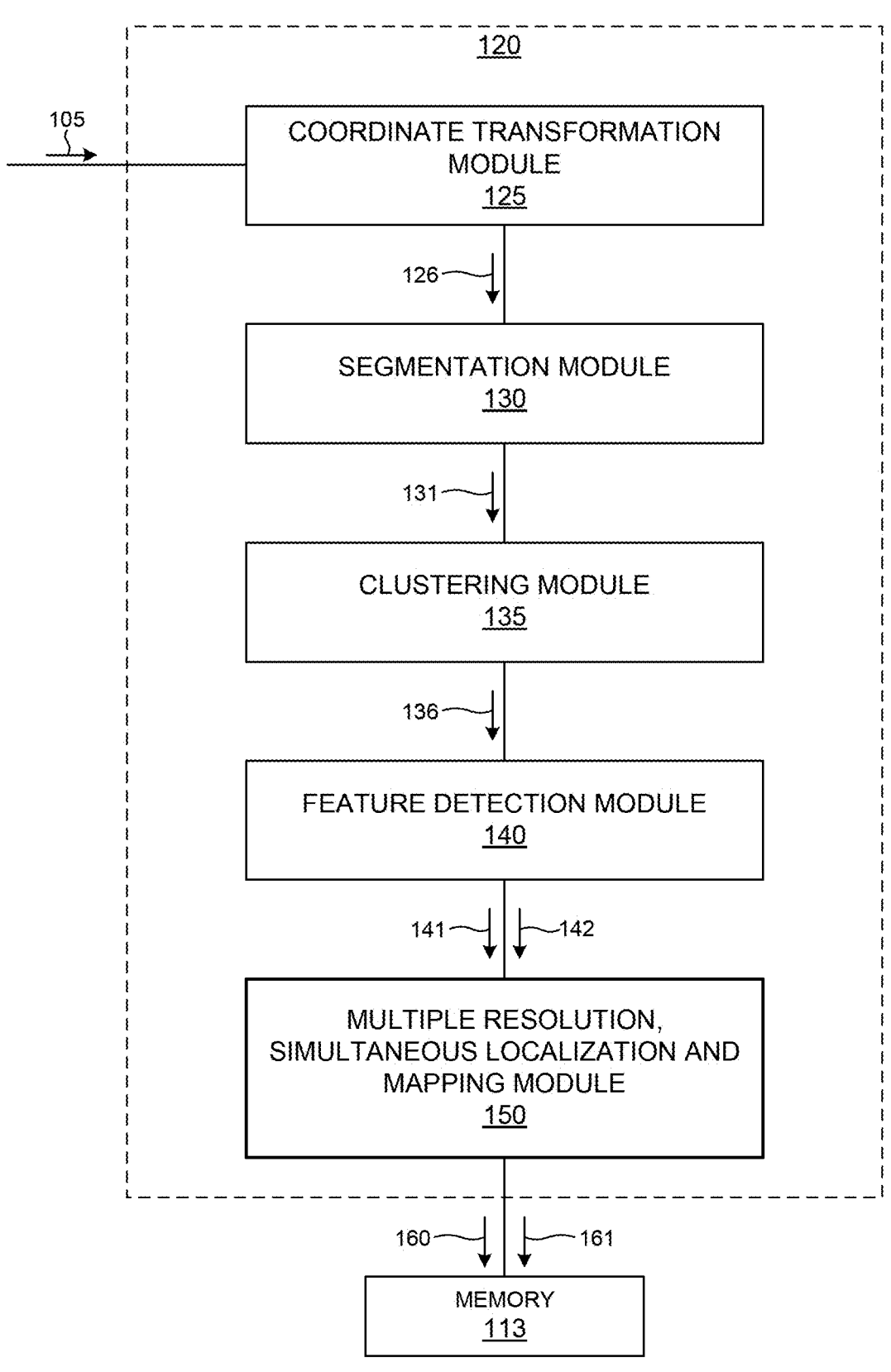
FIG. 2 is a diagram illustrative of an exemplary simultaneous localization and mapping (SLAM) engine 120 implemented by computing system 110 in at least one novel aspect.

FIG. 2 is a diagram illustrative of an exemplary simultaneous localization and mapping (SLAM) engine 120 implemented by computing system 110 in at least one novel aspect. As depicted in FIG. 2, SLAM engine 120 includes a coordinate transformation module 125, a segmentation module 130, a clustering module 135, a feature detection module 140, and a multiple resolution, simultaneous localization and mapping module 150.

As depicted in FIG. 2, coordinate transformation module 125 receives point cloud data 105. A single point cloud (i.e., image frame) includes the pixels measured in one full scan (e.g., 360 degree scan around LIDAR measurement system 104). In general, point cloud data generated by a LIDAR measurement system attached to a vehicle is represented in spherical coordinates. In one example, the location of each measured pixel in three dimensional space is represented by two Euler angles and the distance measurement, itself. Coordinate transformation module 125 performs a coordinate transformation to the point cloud data that converts the coordinate representation of the point cloud data from spherical coordinates to Cartesian coordinates (i.e., X,Y,Z). The Cartesian coordinate data associated with each image frame 126 is communicated to segmentation module 130.

In another aspect, image frames of point cloud data are segmented to remove redundant data before feature extraction. In this manner, each image frame includes high resolution data only in the region of interest (ROI) and lower resolution in regions that are sufficiently well described with fewer pixels, or none at all. By reducing the number of pixels in each image frame, the amount of data associated with each image frame is reduced. This results in reduced communication overhead and downstream computational complexity.

In one embodiment, segmentation module 130 receives the Cartesian coordinate data associated with each image frame 126 captured by LIDAR measurement system 104.

Segmentation module 130 identifies points associated with the ground plane and eliminates redundant points associated with the ground plane.

In one embodiment, segmentation module 130 identifies redundant pixels based on elevation. Assuming the elevation of the ground plane is known apriori (e.g., z-coordinate is zero at the ground plane), pixels having the same elevation as the ground plane are assumed to be associated with the ground plane. Excess pixels associated with the ground plane are eliminated.

In a preferred embodiment, segmentation module 130 employs additional spatial information to confirm whether a particular pixel is associated with the ground plane. Additional information may include local smoothness, data density, etc. In one example, segmentation module 130 subdivides the three dimensional image frame into a 3D grid map. The regular pattern of cells of the 3D grid map increases indexing efficiency, making it easier to insert or retrieve 3D data. In addition, segmentation module 130 projects the cells along the z-direction to generate a 2D grid map. Segmentation module 130 identifies redundant pixels using the 2D grid map.

In one example, segmentation module 130 subjects each pixel to one or more criteria to determine whether the pixel is redundant or not redundant.

In one example, segmentation module 130 determines if the elevation of the pixel is greater than the vehicle height. If the elevation of the pixel is greater than the vehicle height, then it is not redundant (e.g., not ground)

In another example, segmentation module 130 determines if the elevation of the pixel is larger than a threshold value. If the elevation of the pixel is larger than a threshold value, then it is not redundant (e.g., not ground)

In another example, segmentation module 130 determines whether a cell of the 2D projection of the 3D grid map included fewer pixels than a predetermined threshold value. If so, the pixels associated with that cell are determined to be not redundant because the resolution of the pixels is already low.

In another example, segmentation module 130 determines an average value of an optical property associated with each pixel within a cell of the 2D projection. For example, the optical property may be the measured intensity, reflectivity, reliability, or some combination thereof. Segmentation module 130 determines whether the difference between the measured optical property (measured intensity, reflectivity, reliability, or some combination thereof) associated with each pixel and the average value of the measured optical property for all pixels within a cell exceeds a predetermined threshold value. If the value of the optical property is very different from the average value, the pixel is determined to be not redundant.

In another example, segmentation module 130 determines a difference between the maximum elevation (e.g., z-coordinate) value of all of the pixels in a cell and the minimum elevation value of all of the pixels in a cell. If the difference, exceeds a predetermined threshold value, the pixels are determined to be not redundant. A large difference in elevation within a cell indicates a vertical structure, rather than a ground plane.

In another example, segmentation module 130 determines an average value of the elevation associated with the pixels in a cell and the average elevation value associated with pixels in each neighboring cell. If the value of the difference between the average elevation associated with any of the neighboring cells and the cell in question exceeds a predetermined threshold value, the pixels associated with the cell are determined to be not redundant.

Figure 4:
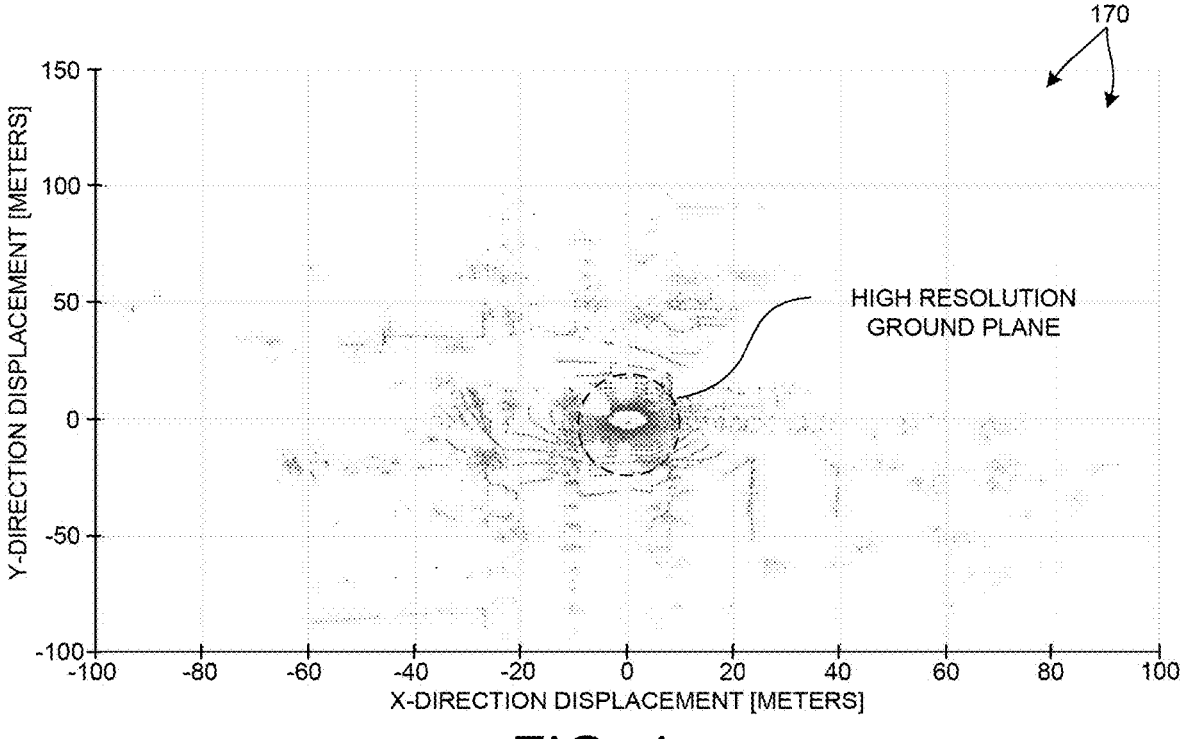
FIG. 4 depicts a plot 170 illustrative of a two dimensional projection of detected pixels of an image frame captured by a LIDAR measurement system, such as LIDAR measurement system 104.

FIG. 4 depicts a plot 170 illustrative of a two dimensional projection of every detected pixel of an image frame captured by a LIDAR measurement system, such as LIDAR measurement system 104. As illustrated in plot 170, pixels are detected within a range of 200 meters in the x-direction and 250 meters in they-direction. The LIDAR measurement system is located at point {o,o} in plot 170.

Figure 5:
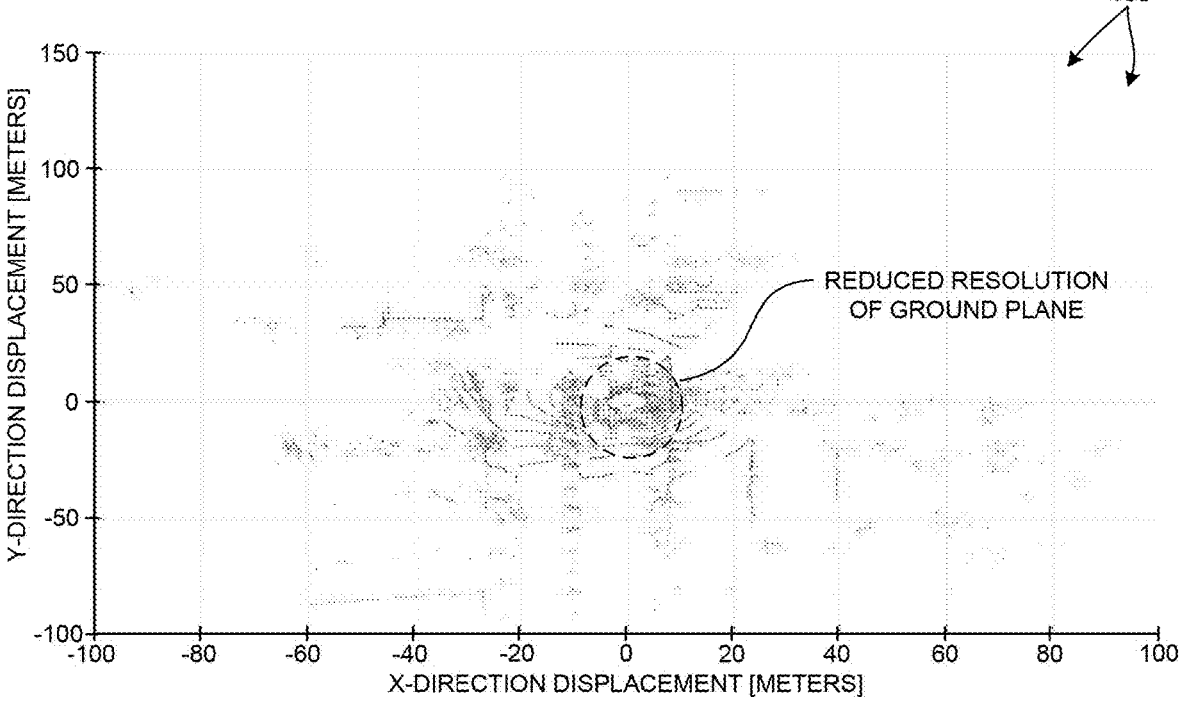
FIG. 5 depicts a plot 180 illustrative of a two dimensional projection of detected pixels of the same image frame depicted in FIG. 4 after segmentation by segmentation module 130.

FIG. 5 depicts a plot 180 illustrative of a two dimensional projection of detected pixels of the same image frame depicted in FIG. 4 after segmentation by segmentation module 130. In this example, the number of pixels has been reduced by 31%. As illustrated in FIGS. 4 and 5, segmentation module 130 eliminated redundant, high resolution pixels associated with measurements of the ground plane near the LIDAR measurement device.

Segmentation module 130 may apply any combination of the aforementioned criteria to determine whether a pixel is redundant or not redundant. In general, the aforementioned criteria are provided by way of non-limiting example, as many other criteria may be contemplated within the scope of this patent document. In some examples, segmentation module 130 receives a group of pixels associated with a complete image frame, operates on the group of pixels, and communicates the segmented group of pixels to clustering module 135. However, in some other examples, segmentation module 130 receives pixel data one pixel at a time and operates on the received pixels sequentially to segment pixels in real time as they are received from the LIDAR measurement system.

After determining whether a particular pixel is redundant or not redundant, segmentation module communicates the image data 131 associated with each non-redundant pixel 131 to clustering module 135. Image data associated with redundant pixels is not communicated to clustering module 135.

In another aspect, image data are clustered to reduce computational complexity of subsequent feature detection operations. In the example depicted in FIG. 2, clustering module 135 receives image data 131 and identifies groups of pixels associated with similar objects. Each group of pixels 136 is communicated to feature detection module 140. In this manner, feature detection module 140 operates on pixel data associated with one object, rather than many objects.

In another aspect, features are quickly extracted from LIDAR image frames based on the measured intensity, reflectivity, reliability, or a combination thereof, associated with each measured pixel.

Typically, the measured image space is subdivided into subregions and local smoothness is calculated for every pixel. Based on the smoothness, the pixels are categorized into four categories, {sharpest, sharp, smooth, smoothest} for each LIDAR channel in each pre-defined subregion in the space. For a LIDAR system having N channels and a frame of M points, each channel has M/N points. For eight subregions, each subregion has K=M/(8N) points. Sorting smoothness values has average computational complexity order, O(M log K). For a LIDAR system having 16 channels (N=16) and image frames having 10,000 points (M=10,000), it is feasible to detect features using this approach with reasonable computational cost. However, for sensors having greater numbers of channels and image frames having larger numbers of pixels (e.g., N=32 and M=S0,000), it is not feasible to achieve results in real time in a cost effective manner.

In one embodiment, features are quickly detected from LIDAR image frames by replacing the spatial gradient calculations with the reflectivity gradient during feature point detection. Spatial gradient values are unbounded, floating point values. For this reason it is computationally intensive to sort these numbers efficiently. In contrast, the reflectivity gradient is a bounded integer and these values can be sorted efficiently (linear complexity, O(M)).

In one embodiment, feature detection module 140 receives an image frame 136 of pixels. Each pixel includes position data (e.g., X,Y,Z coordinates) describing the position of the pixel with respect to the LIDAR measurement system and optical values (e.g., reflectivity, R, Intensity, I, and Reliability, Re) describing the measurement itself. In some embodiments, each pixel includes six attributes {x, y, z, R,I,Re}. In some embodiments, each pixel includes four attributes {x, y, z, R} or {x, y, z, I}. In general, any number of attributes may be contemplated.

In one example, for each LIDAR channel and each subregion of image frame 136, feature detection module 140 computes the reflectivity gradient (abs(Ri-Ri_1)), intensity gradient (abs(Ii-Ii-1)), reliability gradient (abs(Rei-Rei-1)), or any combination thereof, associated with each pixel, i, with respect to a previously measured pixel, i-1. Each of the gradient values determined by feature detection module 140 are integer values, for example, in a range from Oto 255.

For examples where multiple gradients are computed, feature detection module 140 determines an overall contrast value (e.g., where contrast is an approximate measure of curvature). For example, if the reflectivity, intensity, and reliability gradients are all available, the overall contrast is determined by equation (1), where the floor function rounds the element of the function to the nearest integer value less than the value of the element.

$$\text{OverallContrast}=\text{floor}[\tfrac{1}{3}[\text{ReflectivityGradient}+\text{IntensityGradient}+\text{ReliabilityGradient}]] \tag{1}$$

In general, the values of each of the gradients may be weighted by different constants to skew the impact of each gradient value on the overall contrast value.

In addition, feature detection module 140 sorts the pixels into a set of bins. The number of bins is equal to the number of possible integer values of the overall contrast (e.g., 256 bins). Thus, each pixel having a particular overall contrast integer value is located in a corresponding bin.

Feature detection module 140 sorts the bins into different pools of bins (i.e., different feature sets). In one example, four pools are defined: high contrast feature points, low contrast feature points, highest contrast feature points, and lowest contrast feature points, each defined by a predetermined threshold value, highest contrast, #high_contrast, #low_contrast, and #lowest contrast, respectively. In one example, all bins having an overall contrast value greater than or equal to #highest contrast are associated with the highest contrast pool, and all bins having an overall contrast value greater than or equal to #high_contrast, except those identified as highest contrast, are associated with the high contrast pool. Conversely, all bins having an overall contrast value less than or equal to #lowest contrast are associated with the lowest contrast pool, all bins having an overall contrast value less than or equal to #low_contrast, except those identified as lowest contrast, are associated with the low contrast pool. The different pools of features are associated with different objects, e.g., ground, walls, trees, etc. In this manner, feature detection module 140 generates structured output (i.e., feature sets) that identify different physical objects in the surrounding environment.

In this manner, feature detection module 140 generates four pools of feature points for each image frame. The pools of feature points comprise a small feature map (SFM) associated with the image frame. As depicted in FIG. 2, feature detection module 140 communicates the SFM 141 associated with the current frame and the SFM 142 associated with the previous frame to multiple resolution SLAM module 150.

In some examples, a k-dimensional tree, (a.k.a., k-d tree), is employed to organize the point clouds and feature sets. A k-d tree is a binary search tree with other constraints imposed on it. K-d trees are very useful for range and nearest neighbor searches. In the aforementioned examples, the dimension of the k-d tree matches the dimension of the attributes associated with each pixel. For example, for pixels having six attributes {X,Y,Z,R,I,Re}, a six dimensional k-d tree is employed.

In another aspect, an estimation of the location of a LIDAR measurement system is quickly determined based on low resolution feature maps refreshed at a high repetition rate, while the estimation of location is accurately updated based on higher resolution feature maps refreshed at a lower repetition rate.

Figure 3:
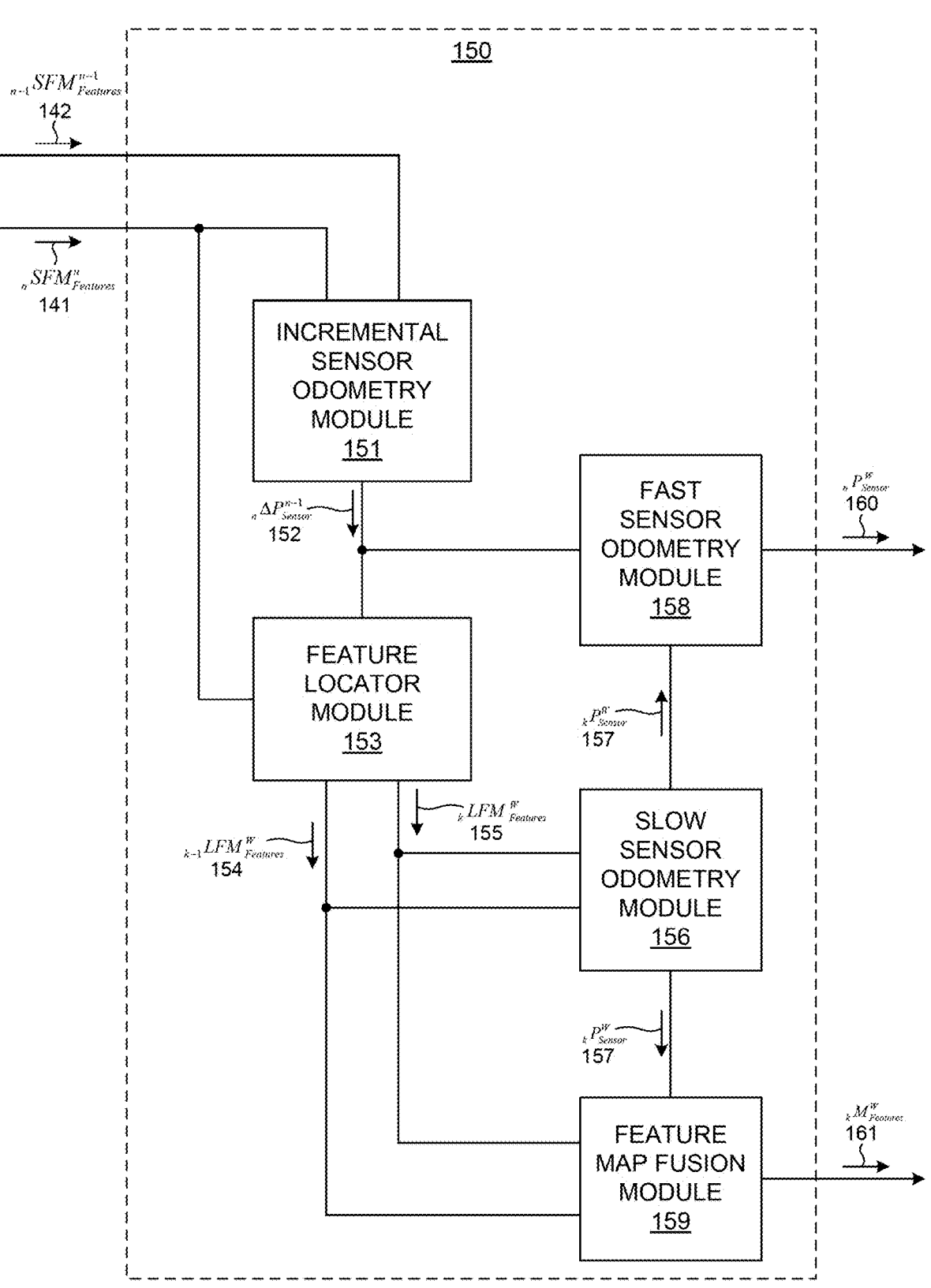
FIG. 3 is a diagram illustrative of multiple resolution SLAM module 150 in further detail.

FIG. 3 is a diagram illustrative of multiple resolution SLAM module 150 in further detail. As depicted in FIG. 3, SLAM module 150 includes incremental sensor odometry module 151, feature locator module 153, fast sensor odometry module 158, slow sensor odometry module 156, and feature map fusion module 159.

As depicted in FIG. 3, SFM 141 associated with the current frame and SFM 142 associated with the previous frame are received by incremental sensor odometry module 151. As illustrated in FIG. 3, SFM 141 is a feature map that specifies the locations of selected features with respect to the location of the LIDAR measurement system at the time of acquisition of the current image frame (nth frame) and SFM 142 is a feature map that specifies the locations of selected features with respect to the location of the LIDAR measurement system at the time of acquisition of the previous image frame (n−1 frame).

In the embodiment depicted in FIG. 3, incremental sensor odometry module 151 estimates the six degree of freedom (e.g., X,Y,Z,Rx,Ry,Rz) position of the LIDAR measurement system at the nth feature set (i.e., SFMn) with respect to the position of the LIDAR measurement system at the n−1 feature set (i.e., $SFM_{n-1}$), n Psensorn-i. n Psensorn-i is determined by the optimal fit of the selected features in SFMn with the same features in $SFM_{n-1}$. In one example, approximately three hundred features are selected for this analysis. The estimation of $n\Delta Psensor^{n-1}$ is performed in real-time to match the LiDAR measurement system image frame update rate (e.g., 10 Hz),It is assumed that angular and linear velocities of the LIDAR measurement system are smooth and continuous over the update period (e.g., 0.1 seconds). However, in the event that abrupt changes in velocity occur, the multiple resolution SLAM module 150 receives input from an inertial measurement unit (IMU) of the LIDAR measurement system and compensates for the abrupt changes in velocity.

In one example, incremental sensor odometry module 151 estimates n $Psensor^{n-1}$ by minimizing residuals of equation $$d = x - f(n-1P \text{ Sensor}) \qquad (2)$$

where x is a feature point from the current feature set and equation (2) represents a geometric relationship (i.e., translation and rotation) between an edge point and corresponding edge-line or between a planar point and corresponding planar patch. For example, equation (2) includes point-to-plane distances, point-to-line distances, etc. Dis a vector of distances, d, and each feature point x has a distance, d, and relation defined by a non-linear function $f$. Equation (3) illustrates an estimate of $_n P\Delta sensor^{n-1}$ at each iteration of a non-linear least squares minimization.

$$_n\Delta P_{Sensor}^{n-1} = n - 1^P Sensor + \left(J^T J + \lambda \text{diag}(J^T J)\right)^{-1} J^T D \qquad (3)$$

where $\lambda$ is a scalar factor determined by the levenberg-marquardt algorithm, J is the Jacobian (derivative) of the function, f. The Jacobian is determined by numerical differentiation. The non-linear least squares minimization identifies the one position that minimizes the residuals defined by equation (2).

In the embodiment depicted in FIG. 3, $_n\Delta Psensor^{n-1}$ 152 is communicated to feature locator module 153. Feature locator module 153 projects the feature points of the current frame, SFMFeatures$^n$, to the world coordinate frame I w. at the update rate of the LIDAR measurement system (e.g., 10 Hz). This is performed repeatedly for successive SFMs to generate a large feature map (LFM) having higher resolution than a SFM. A LFM is generated over a longer time period than a SFM (e.g., every second, rather than every 0.1 seconds).

In the embodiment depicted in FIG. 3, a slow sensor odometry module 156 receives the current LFM ($_k$LFMFeatures$^w$ 155) that describes the location of many features (more than a SFM) with respect to the world coordinate frame, W, at the current large frame index, k. Slow sensor odometry module 156 also receives the previous LFM ($_{k-1}$LFMFeatures$^w$ 154) that describes the location of many features with respect to the world coordinate frame, W, at the previous large frame index, k−1. Slow sensor odometry module 156 estimates the current six degree of freedom location of the LIDAR measurement system in the world frame, $_k$Psensor$^w$ 157, with respect to the six degree of freedom position of the LIDAR measurement system in the world coordinate frame at the previous frame by an optimal fit of the most important features in the current LFM with the previous LFM. The optimization is analogous to the optimization described with reference to incremental sensor odometry module 151, except that the feature sets are larger and are referenced to the world coordinate frame. In one example, this fitting is performed at a rate of 1 Hz.

In the embodiment depicted in FIG. 3, a fast sensor odometry module 158 receives the current location of the LIDAR measurement system in the world frame, kPsensor$^w$ 157, at the current large frame index, k. Fast sensor odometry module 158 estimates the current six degree of freedom position of the sensor with respect to the world coordinate frame at the current small frame index, n, ($_n$Psensor$^w$ 160) by incrementally adding each successive incremental displacement, (e.g. $_n$ΔPsensor$^{n-1}$) to the estimate $_k$Psensor$^w$ 157 measured with respect to the world coordinate frame. This continues until a new estimate of sensor position is generated by slow sensor odometry module 156 (e.g., $_{k+1}$Psensor$^w$). At that point in time, fast sensor odometry module 158 considers the new estimate as the baseline position of the sensor and incrementally adds each successive incremental displacement to the baseline position until another new estimate is provided by slow sensor odometry module 156. In this manner, fast sensor odometry module provides an updated estimate of the position of the sensor with respect to the world coordinate frame at a relatively fast update rate (e.g., 10 Hz). This update is periodically corrected by the more accurate estimate of sensor position with respect to the world coordinate frame provided by the slow sensor odometry module 156 at a relatively slow update rate (e.g., 1 Hz) As described hereinbefore, the incremental changes in position of the sensor are provided by incremental sensor odometry module 151 based on relatively low resolution feature maps, while the changes in position of the sensor provided by the slow sensor odometry module are based on relatively high resolution feature maps. In this manner, errors induced by position estimates based on low resolution feature maps are periodically corrected by more accurate estimates based on high resolution feature maps.

In the embodiment depicted in FIG. 3, a feature map fusion module 159 receives the current location of the LIDAR measurement system in the world frame, $_k$Psensor$^w$ 157, the current LFM, $_k$LFMFeatures$^w$ 155, and the previous LFM, $_{k-1}$LFMFeatures$^W$ 154. Feature map fusion module 159 consistently fuses $_k$LFMFeatures$^w$ 155 and $_{k-1}$LFMFeatures$^w$ 154 based on the current sensor position, $_k$Psensor$^w$ 157, and combines the fused feature map into a global grid map, $_k$MFeatures$^w$ 161 that identifies the locations of features (buildings, trees, etc.) with respect to the world coordinate frame. In one example, this occurs at an update rate of 1 Hz.

As depicted in FIG. 2, by way of non-limiting example, map 161 and position estimate 160 are stored in memory 113 of computing system 110, or any other suitable memory device (e.g., external memory or memory on board LIDAR measurement system 104).

Figure 6:
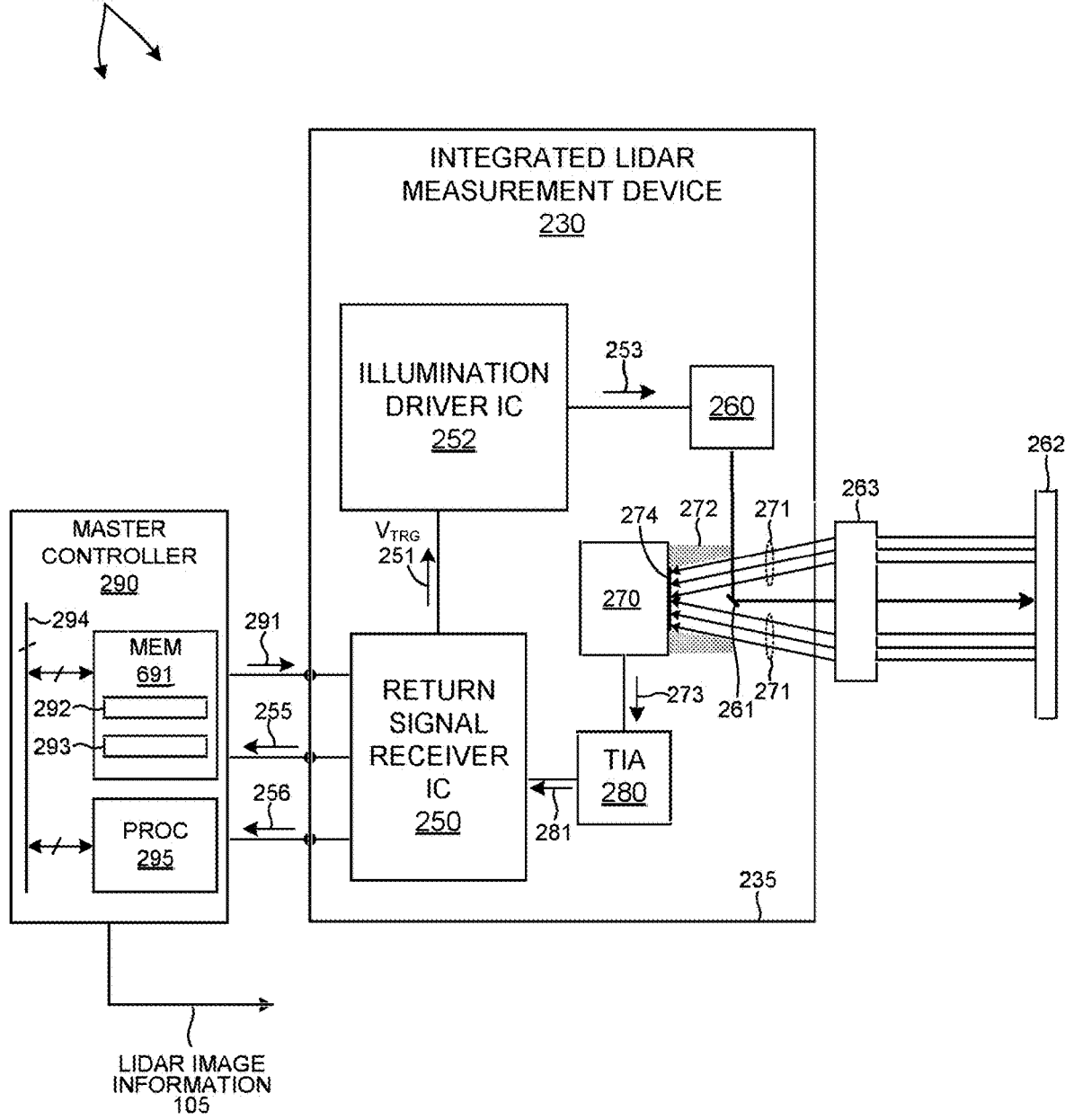
FIG. 6 is a simplified diagram illustrative of one embodiment of a LIDAR measurement system including at least on integrated LIDAR measurement device in at least one novel aspect.

FIG. 6 depicts LIDAR measurement system 104 in one embodiment. The embodiment of LIDAR measurement system 104 depicted in FIG. 6 is provided by way of non-limiting example, as many other LIDAR measurement systems may be employed to provide LIDAR image information as described herein. LIDAR measurement system 104 includes a master controller 290 and one or more integrated LIDAR measurement devices 230. An integrated LIDAR measurement device 230 includes a return signal receiver integrated circuit (IC), an illumination driver integrated circuit (IC) 252, an illumination source 260, a photodetector 270, and a trans-impedance amplifier (TIA) 280. Each of these elements is mounted to a common substrate 235 (e.g., printed circuit board) that provides mechanical support and electrical connectivity among the elements.

Illumination source 260 emits a measurement pulse of illumination light 262 in response to a pulse of electrical current 253. In some embodiments, the illumination source 260 is laser based (e.g., laser diode) In some embodiments, the illumination source is based on one or more light emitting diodes. In general, any suitable pulsed illumination source may be contemplated. Illumination light 262 exits LIDAR measurement device 104 and reflects from an object in the surrounding three dimensional environment under measurement. A portion of the reflected light is collected as return measurement light 271 associated with the measurement pulse 262. As depicted in FIG. 6, illumination light 262 emitted from integrated LIDAR measurement device 230 and corresponding return measurement light 271 directed toward integrated LIDAR measurement device share a common optical path.

In one aspect, the illumination light 262 is focused and projected toward a particular location in the surrounding environment by one or more beam shaping optical elements 263 and a beam scanning device of LIDAR measurement system 104. In a further aspect, the return measurement light 271 is directed and focused onto photodetector 270 by the beam scanning device and the one or more beam shaping optical elements 263 of LIDAR measurement system 104. The beam scanning device is employed in the optical path between the beam shaping optics and the environment under measurement. The beam scanning device effectively expands the field of view and increases the sampling density within the field of view of the 3-D LIDAR system.

In the embodiment depicted in FIG. 6, the beam scanning device is a moveable mirror element that is rotated about an axis of rotation by a rotary actuator. Command signals generated by master controller 290 are communicated from master controller 290 to a rotary actuator. In response, the rotary actuator scans the moveable mirror element in accordance with a desired motion profile.

Integrated LIDAR measurement device 230 includes a photodetector 270 having an active sensor area 274. As depicted in FIG. 6, illumination source 260 is located outside the field of view of the active area 274 of the photodetector. As depicted in FIG. 6, an overmold lens 272 is mounted over the photodetector 270. The overmold lens 272 includes a conical cavity that corresponds with the ray acceptance cone of return light 271. Illumination light 262 from illumination source 260 is injected into the detector reception cone by a fiber waveguide. An optical coupler optically couples illumination source 260 with the fiber waveguide. At the end of the fiber waveguide, a mirror element 261 is oriented at a 45 degree angle with respect to the waveguide to inject the illumination light 262 into the cone of return light 271. In one embodiment, the end faces of fiber waveguide are cut at a 45 degree angle and the end faces are coated with a highly reflective dielectric coating to provide a mirror surface. In some embodiments, the waveguide includes a rectangular shaped glass core and a polymer cladding of lower index of refraction. In some embodiments, the entire optical assembly is encapsulated with a material having an index of refraction that closely matches the index of refraction of the polymer cladding. In this manner, the waveguide injects the illumination light 262 into the acceptance cone of return light 271 with minimal occlusion.

The placement of the waveguide within the acceptance cone of the return light 271 projected onto the active sensing area 274 of detector 270 is selected to ensure that the illumination spot and the detector field of view have maximum overlap in the far field.

As depicted in FIG. 6, return light 271 reflected from the surrounding environment is detected by photodetector 270. In some embodiments, photodetector 270 is an avalanche photodiode. Photodetector 270 generates an output signal 273 that is amplified by an analog trans-impedance amplifier (TIA) 280. However, in general, the amplification of output signal 273 may include multiple, amplifier stages. In this sense, an analog trans-impedance amplifier is provided by way of non-limiting example, as many other analog signal amplification schemes may be contemplated within the scope of this patent document. Although TIA 280 is depicted in FIG. 6 as a discrete device separate from the receiver IC 250, in general, TIA 280 may be integrated with receiver IC 250. In some embodiments, it is preferable to integrate TIA 280 with receiver IC 250 to save space and reduce signal contamination.

The amplified signal 281 is communicated to return signal receiver IC 250. Receiver IC 250 includes timing circuitry and a time-to-digital converter that estimates the time of flight of the measurement pulse from illumination source 260, to a reflective object in the three dimensional environment, and back to the photodetector 270. A signal 255 indicative of the estimated time of flight is communicated to master controller 290 for further processing and communication to a user of the LIDAR measurement system 104. In addition, return signal receiver IC 250 is configured to digitize segments of the return signal 281 that include peak values (i.e., return pulses), and communicate signals 256 indicative of the digitized segments to master controller 290. In some embodiments, master controller 290 processes these signal segments to identify properties of the detected object. In some embodiments, master controller 290 communicates signals 256 to a user of the LIDAR measurement system 104 for further processing.

Master controller 290 is configured to generate a pulse command signal 291 that is communicated to receiver IC 250 of integrated LIDAR measurement device 230. Pulse command signal 291 is a digital signal generated by master controller 290. Thus, the timing of pulse command signal 291 is determined by a clock associated with master controller 290. In some embodiments, the pulse command signal 291 is directly used to trigger pulse generation by illumination driver IC 252 and data acquisition by receiver IC 250. However, illumination driver IC 252 and receiver IC 250 do not share the same clock as master controller 290. For this reason, precise estimation of time of flight becomes much more computationally tedious when the pulse command signal 291 is directly used to trigger pulse generation and data acquisition.

In general, a LIDAR measurement system includes a number of different integrated LIDAR measurement devices 230 each emitting a pulsed beam of illumination light from the LIDAR device into the surrounding environment and measuring return light reflected from objects in the surrounding environment.

In these embodiments, master controller 290 communicates a pulse command signal 291 to each different integrated LIDAR measurement device. In this manner, master controller 290 coordinates the timing of LIDAR measurements performed by any number of integrated LIDAR measurement devices. In a further aspect, beam shaping optical elements 263 and the beam scanning device are in the optical path of the illumination pulses and return measurement pulses associated with each of the integrated LIDAR measurement devices. In this manner, the beam scanning device directs each illumination pulse and return measurement pulse of LIDAR measurement system 104.

In the depicted embodiment, receiver IC 250 receives pulse command signal 291 and generates a pulse trigger signal, VTRG 251, in response to the pulse command signal 291. Pulse trigger signal 251 is communicated to illumination driver IC 252 and directly triggers illumination driver IC 252 to electrically couple illumination source 260 to a power supply and generate a pulse of illumination light 262. In addition, pulse trigger signal 251 directly triggers data acquisition of return signal 281 and associated time of flight calculation. In this manner, pulse trigger signal 251 generated based on the internal clock of receiver IC 250 is employed to trigger both pulse generation and return pulse data acquisition. This ensures precise synchronization of pulse generation and return pulse acquisition which enables precise time of flight calculations by time-to-digital conversion.

Figure 7:
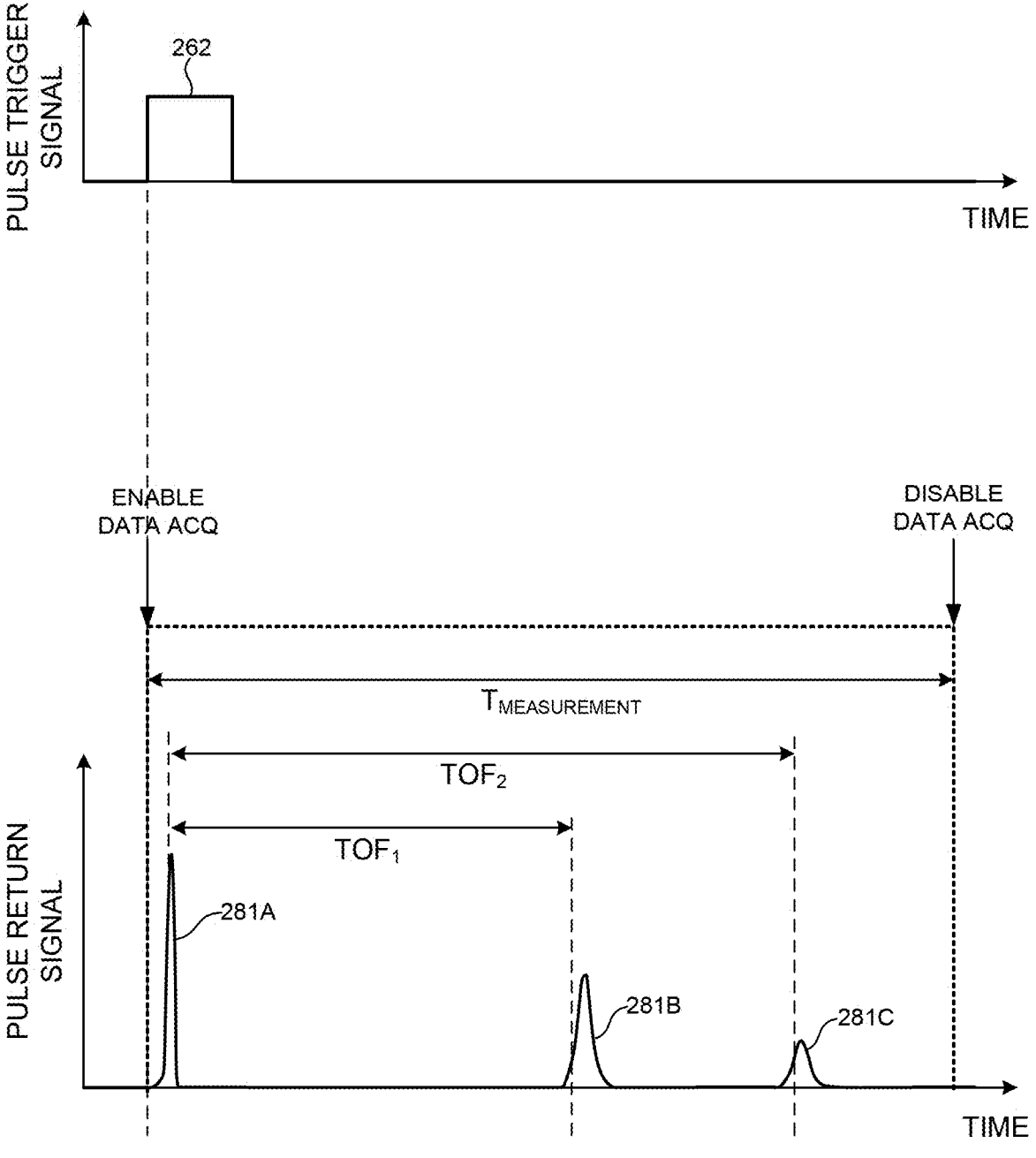
FIG. 7 depicts an illustration of the timing associated with the emission of a measurement pulse from an integrated LIDAR measurement device 130 and capture of the returning measurement pulse.

FIG. 7 depicts an illustration of the timing associated with the emission of a measurement pulse from an integrated LIDAR measurement device 230 and capture of the returning measurement pulse. As depicted in FIG. 7, a measurement is initiated by the rising edge of pulse trigger signal 262 generated by receiver IC 250. As depicted in FIGS. 6 and 7, an amplified, return signal 281 is received by receiver IC 250. As described hereinbefore, a measurement window (i.e., a period of time over which collected return signal data is associated with a particular measurement pulse) is initiated by enabling data acquisition at the rising edge of pulse trigger signal 262. Receiver IC 250 controls the duration of the measurement window, Tmeasurement, to correspond with the window of time when a return signal is expected in response to the emission of a measurement pulse sequence. In some examples, the measurement window is enabled at the rising edge of pulse trigger signal 262 and is disabled at a time corresponding to the time of flight of light over a distance that is approximately twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 7, return signal 281 includes three return measurement pulses that correspond with the emitted measurement pulse. In general, signal detection is performed on all detected measurement pulses. Further signal analysis may be performed to identify the closest valid signal 281B (i.e., first valid instance of the return measurement pulse), the strongest signal, and the furthest valid signal 281C (i.e., last valid instance of the return measurement pulse in the measurement window). Any of these instances may be reported as potentially valid distance measurements by the LIDAR system.

Internal system delays associated with emission of light from the LIDAR system (e.g., signal communication delays and latency associated with the switching elements, energy storage elements, and pulsed light emitting device) and delays associated with collecting light and generating signals indicative of the collected light (e.g., amplifier latency, analog-digital conversion delay, etc.) contribute to errors in the estimation of the time of flight of a measurement pulse of light. Thus, measurement of time of flight based on the elapsed time between the rising edge of the pulse trigger signal 262 and each valid return pulse (i.e., 281B and 281C) introduces undesirable measurement error. In some embodiments, a calibrated, pre-determined delay time is employed to compensate for the electronic delays to arrive at a corrected estimate of the actual optical time of flight. However, the accuracy of a static correction to dynamically changing electronic delays is limited. Although, frequent re-calibrations may be employed, this comes at a cost of computational complexity and may interfere with system up-time.

In another aspect, receiver IC 250 measures time of flight based on the time elapsed between the detection of a detected pulse 281A due to internal cross-talk between the illumination source 260 and photodetector 270 and a valid return pulse (e.g., 281B and 281C). In this manner, systematic delays are eliminated from the estimation of time of flight. Pulse 281A is generated by internal cross-talk with effectively no distance of light propagation. Thus, the delay in time from the rising edge of the pulse trigger signal and the instance of detection of pulse 281A captures all of the systematic delays associated with illumination and signal detection. By measuring the time of flight of valid return pulses (e.g., return pulses 281B and 181C) with reference to detected pulse 281A, all of the systematic delays associated with illumination and signal detection due to internal cross-talk are eliminated. As depicted in FIG. 7, receiver IC 250 estimates the time of flight, $TOF_1$, associated with return pulse 281B and the time of flight, $TOF_2$, associated with return pulse 281C with reference to return pulse 281A.

In some embodiments, the signal analysis is performed by receiver IC 250, entirely. In these embodiments, signals 255 communicated from integrated LIDAR measurement device 230 include an indication of the time of flight determined by receiver IC 250. In some embodiments, signals 256 include digitized segments of return signal 281 generated by receiver IC 250. These raw measurement signal segments are processed further by one or more processors located on board the 3-D LIDAR system (e.g., processor 295), or external to the 3-D LIDAR system to arrive at another estimate of distance, an estimate of one of more properties of the detected object or measurement, such as reflectivity, intensity, reliability, or a combination thereof.

Master controller 290 or any external computing system may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 292 implementing methods such as those described herein may be transmitted over a transmission medium such as a wire, cable, or wireless transmission link. For example, as illustrated in FIG. 6, program instructions 292 stored in memory 691 are transmitted to processor 295 over bus 294. Program instructions 292 are stored in a computer readable medium (e.g., memory 691). Exemplary computer-readable media include read-only memory, a random access memory, a magnetic or optical disk, or a magnetic tape.

FIG. 8 illustrates a flowchart of a method 200 suitable for implementation by a LIDAR measurement system as described herein. In some embodiments, LIDAR measurement system 104 is operable in accordance with method 200 illustrated in FIG. 8. However, in general, the execution of method 200 is not limited to the embodiments of LIDAR measurement system 104 described with reference to FIG. 1.

These illustrations and corresponding explanation are provided by way of example as many other embodiments and operational examples may be contemplated.

In block 201, a plurality of points are measured in a three dimensional environment with a moving LIDAR measurement system.

In block 202, a time sequence of image frames is generated. Each of the image frames includes a plurality of measured points each associated with a measurement of a different location in the three dimensional environment with respect to the LIDAR measurement system. Each measurement of each of the plurality of measured points includes an indication of location of the measured point with respect to the LIDAR measurement system and an indication of an optical property of the measurement.

In block 203, a location of the LIDAR measurement system at a current image frame with respect to an immediately prior image frame is estimated.

In block 204, a first large feature map is generated from a first sequence of small feature maps by projecting the measured points of each of the first sequence of small feature maps to a world coordinate frame fixed to the 3-D environment.

In block 205, a second large feature map is generated from a second sequence of small feature maps by projecting the measured points of each of the second sequence of small feature maps to the world coordinate frame fixed to the 3-D environment. The second sequence of small feature maps immediately follows the first sequence of small feature maps.

In block 206, a current location of the LIDAR measurement system with respect to the world coordinate frame is estimated based on the first and second large feature maps.

It should be recognized that the various steps described throughout the present disclosure may be carried out by a single computer system 110 or, alternatively, a multiple computer system 110. Moreover, different subsystems of the LIDAR measurement system 104, may include a computer system suitable for carrying out at least a portion of the steps described herein. Therefore, the aforementioned description should not be interpreted as a limitation on the present invention but merely an illustration. Further, the one or more computing systems 110 may be configured to perform any other step(s) of any of the method embodiments described herein.

In addition, the computer system 110 may be communicatively coupled to LIDAR measurement system 104 in any manner known in the art. For example, the one or more computing systems 110 may be coupled to computing systems associated with LIDAR measurement system 104. In another example, the integrated LIDAR measurement device 230 may be controlled directly by computer system 110.

The computer system 110 may be configured to receive and/or acquire data or information from the LIDAR measurement system 104 by a transmission medium that may include wireline and/or wireless portions. In this manner, the transmission medium may serve as a data link between the computer system 110 and other subsystems of the LIDAR measurement system 104.

Computer system 110 may be configured to receive and/or acquire data or information (e.g., LIDAR measurement results, compressed data sets, segmented data sets, feature sets, etc.) from other systems by a transmission medium that may include wireline and/or wireless portions. In this manner, the transmission medium may serve as a data link between the computer system 110 and other systems (e.g., memory on-board LIDAR measurement system 104, external memory, or external systems).For example, the computing system 110 may be configured to receive measurement data (e.g., LIDAR image information 105) from a storage medium (i.e., memory 113 or memory 691) via a data link. Moreover, the computer system 110 may send data to other systems via a transmission medium. For instance, feature maps and location information determined by computer system 110 may be stored in a permanent or semi-permanent memory device (e.g., memory 114). In another example, mapping information 109 and location information 108 may be communicated to vehicle controller 107. In this regard, measurement results may be exported to another system.

Computing system 110 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 115 implementing methods such as those described herein may be transmitted over a transmission medium such as a wire, cable, or wireless transmission link. For example, as illustrated in FIG. 1, program instructions stored in memory 113 are transmitted to processor 111 over bus 112. Program instructions 115 are stored in a computer readable medium (e.g., memory 113). Exemplary computer-readable media include read-only memory, a random access memory, a magnetic or optical disk, or a magnetic tape.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system, comprising:
a photodetector that detects an amount of return light reflected from a point in a three dimensional environment in response to a pulse of illumination light;
a simultaneous localization and mapping engine, configured to:
receive a time sequence of image frames, each image frame including a plurality of measured points, each associated with a location in a three dimensional environment;
generate a plurality of small feature maps, each small feature map corresponding to a respective image frame in the time sequence of image frames, wherein each small feature map is generated by:
segmenting and clustering the plurality of measured points in a respective image frame; and
extracting one or more feature points from the respective image frame;
generating a first large feature map from a first sequence of the small feature maps by projecting the feature points of each of the first sequence of small feature maps to a world coordinate frame fixed to the three dimensional environment; and
generating a second large feature map from a second sequence of the small feature maps by projecting the feature points of each of the second sequence of small feature maps to the world coordinate frame fixed to the three dimensional environment, wherein the second sequence of small feature maps follows the first sequence of small feature maps; and
estimate a location of the system within the three dimensional environment.

2. The system of claim 1, wherein the simultaneous localization and mapping engine is further configured to:
estimate a second location of the system with respect to the world coordinate frame based on the location of the system.

3. The system of claim 1, wherein the simultaneous localization and mapping module include one or more odometry modules configured to estimate a position of the system.

4. The system of claim 3, wherein a first odometry meter provides an estimate of the position of the system at a rate of 10 Hz, and a second odometry meter provides an estimate of the position of the system at a rate of 1 Hz.

5. The system of claim 1, wherein the simultaneous localization and mapping module utilizes a k-dimensional tree to organize the feature points.

6. The system of claim 5, wherein the k-dimensional tree matches a dimension of attributes associated with the measured points.

7. The system of claim 1, wherein the simultaneous localization and mapping module generates a large feature map based at least in part on the small feature maps.

8. The system of claim 1, wherein each image frame comprises high resolution data in a region of interest.

9. The system of claim 1, wherein the simultaneous localization and mapping module further estimates an updated current location of the system with respect to the world coordinate frame based on a current location of the system and a location of the system at the current image frame with respect to an immediately prior image frame.

10. The system of claim 1, wherein clustering the plurality of measured points in the respective image frame comprises clustering a subset of measured points associated with the respective image frame into one or more sub-groups each associated with one or more similar objects.

11. The system of claim 1, wherein extracting the one or more feature points from the respective image frame comprises identifying a subset of measured points associated with the respective image frame, based at least in part on an optical property of each of the subset of measured points.

12. The system of claim 1, wherein an optical property of each of the plurality of measured points includes at least one of reflectivity, an intensity of return light, and a reliability of a measurement of a measured point of the plurality of measured points.

13. A method comprising:

generating, by a LIDAR system, a time sequence of image frames, each image frame including a plurality of measured points, each associated with a location in a three dimensional environment;

generating a plurality of small feature maps, each small feature map corresponding to a respective image frame in the time sequence of image frames, wherein each small feature map is generated by:

segmenting and clustering the plurality of measured points in a respective image frame; and extracting one or more feature points from the respective image frame;

generating a first large feature map from a first sequence of the small feature maps by projecting the feature points of each of the first sequence of small feature maps to a world coordinate frame fixed to the three dimensional environment; and generating a second large feature map from a second sequence of the small feature maps by projecting the feature points of each of the second sequence of small feature maps to the world coordinate frame fixed to the three dimensional environment, wherein the second sequence of small feature maps follows the first sequence of small feature maps; and estimating a location of the system within the three dimensional environment.

14. The method of claim 13, wherein segmenting the plurality of measured points in the respective image frame further comprises:

subdividing the respective image frame into a three dimensional grid of cells;

projecting the three dimensional grid of cells onto a two dimensional grid of cells along a height dimension;

for each respective cell in the two dimensional grid of cells, determining an average value of an optical property of the measured points within the respective cell; and for each respective measured point of the measured points within the respective cell, (i) determining a difference between a value of the optical property of the respective measured point and an average value of the optical property for the respective cell, and (ii) retaining the respective measured point within the respective cell if the difference exceeds a predetermined threshold value.

15. The method of claim 14, wherein the retained respected measured points plurality of measured points are retained for further analysis.

16. The method of claim 14, wherein the optical property includes at least one of a reflectivity, an intensity of return light, and a reliability of the measurement.

17. The method of claim 13, wherein each of the plurality of measured points includes an indication of a location of the measured point with respect to the LIDAR system.

18. The method of claim 13, further comprising estimating an updated current location of the LIDAR system with respect to the world coordinate frame based on the location of the LIDAR system and a location of the LIDAR system at a current image frame with respect to an immediately prior image frame.

19. The method of claim 13, wherein clustering the plurality of measured points in the respective image frame comprises clustering a subset of measured points associated with the respective image frame into one or more sub-groups each associated with one or more similar objects.

20. The method of claim 13, wherein extracting the one or more feature points from the respective image frame comprises identifying the one or more feature points based on an optical property of each of a subset of measured points.

* * * * *